V. KING.
GRASS GUARD FOR MOWERS.
APPLICATION FILED JAN. 25, 1917.
1,256,700.
Patented Feb. 19, 1918.
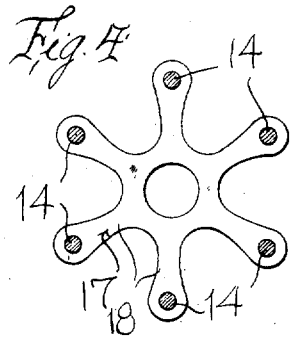
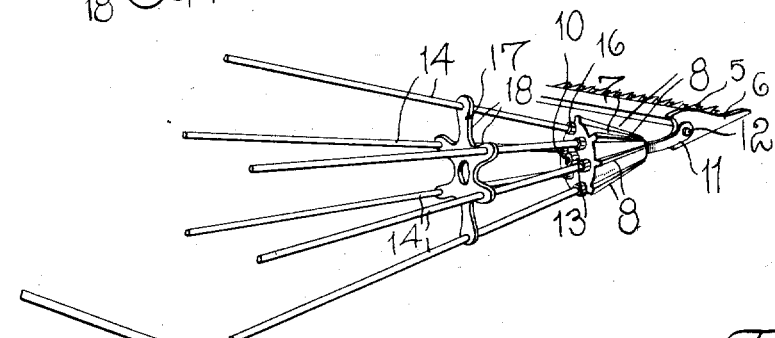
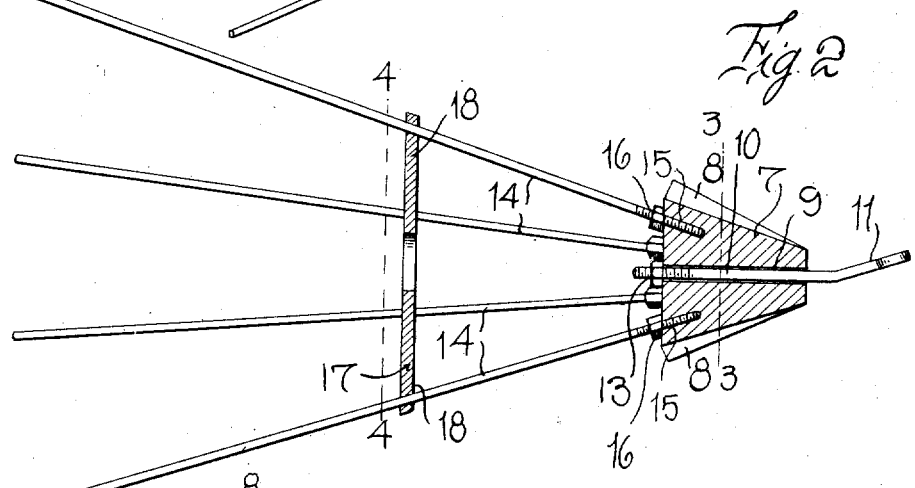
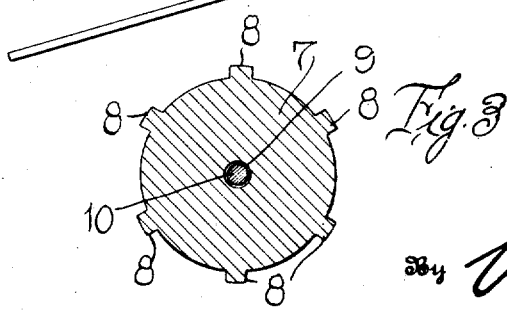
Inventor
VERNESS KING
By Watson E. Coleman
Attorney

UNITED STATES PATENT OFFICE.

VERNESS KING, OF FRANKLINVILLE, NEW YORK.

GRASS-GUARD FOR MOWERS.

1,256,700.                Specification of Letters Patent.       Patented Feb. 19, 1918.

Application filed January 25, 1917. Serial No. 144,476.

*To all whom it may concern:*

Be it known that I, VERNESS KING, a citizen of the United States, residing at Franklinville, in the county of Cattaraugus and State of New York, have invented certain new and useful Improvements in Grass-Guards for Mowers, of which the following is a specification, reference being had to the accompanying drawings.

This invention relates to an improved grass guard for mowers, and has for its primary object to provide a very simple and effective device for automatically lifting the grass and deflecting the same to one side of the swath being cut by the mower.

It is another object of the invention to provide a rotary grass guard for the above purpose, which is operatively connected to the swathboard or shoe of the mower, and means operating by contact with the ground in the movement of the mower to rotate the guard.

It is a further general object of my invention to provide a device for the above purpose, which is simple and durable in its construction, eliminates the necessity of using gears or other power transmitting means, and may be easily and quickly mounted in operative position upon the ordinary mower without necessitating alterations of any character in the latter.

With the above and other objects in view, my invention consists in the novel features of construction, combination and arrangement of parts to be hereinafter more fully described, claimed and illustrated in the accompanying drawing, in which, Figure 1 is a perspective view illustrating my improved guard applied to the swathboard of a mower;

Fig. 2 is a longitudinal section;

Fig. 3 is a section taken on the line 3—3 of Fig. 2; and

Fig. 4 is a section taken on the line 4—4 of Fig. 2.

Referring in detail to the drawing, 5 designates the finger bar of a mowing machine, at the end of which the usual swathboard or shoe 6 is arranged.

The present invention includes a substantially conical-shaped, metal head 7 which is provided upon its periphery with spaced ribs 8 which converge toward each other from the larger to the smaller end of said head. This head has a central longitudinal bore 9 through which a rod or bolt 10 loosely extends. One end of this bolt is curved and flattened, as at 11, and pivotally secured against the outer side face of the swathboard 6 by means of the bolt 12. The other end of the bolt 10 is threaded to receive a nut 13, whereby the head 7 is retained upon said bolt. The head 7 is disposed rearwardly of the swathboard or shoe 6, and the smaller end of said head is in opposed relation to the swathboard.

A plurality of guard rods 14, preferably six in number, have one of their ends threaded for engagement in threaded sockets 15 provided in the larger end of the head 7, and a nut 16 is threaded upon each of these rods for engagement against the under face of the head. These guard rods are braced and supported in spaced relation to each other by means of a spider 17 disposed within the circular series of rods intermediate of their ends, said spider having radially disposed arms 18 each provided with an opening through which one of the guard rods extends.

In the operation of the device, it will be understood that the teeth or ribs 8 on the conical head 7 engage upon the ground in the movement of the mowing machine, and as these ribs strike the ground at an angle with respect to the line of movement of the machine, the head and consequently the rods 14 carried thereby, are caused to rotate. To insure such rotation, the shank of the bolt 10 is disposed at a slight inclination with respect to its flattened end portion 11 so that the longitudinal axis of the head 7 will be obliquely disposed in an inward direction with respect to the end of the mower. As the guard rotates or revolves, the rearwardly diverging rods 14 thrust the grass back or outwardly to one side of the swath being cut, so that the same will not become entangled in the wheat or other grain.

From the above description, taken in connection with the accompanying drawing, it will be seen that I have produced a very simple, reliable and efficient grass guard attachment for mowers which can be readily applied to the finger bar of the ordinary mowing machine without necessitating any structural alterations in the latter. As the radial movement of the guard is effected simply by the contact of the conical head with the ground surface, the use of gears, chains, or other means for imparting a positive rotation to the guard, is obviated. The device as a whole is also exceedingly simple, as well as durable in its construction, and may obviously be manufactured at relatively small cost.

While I have shown and described the preferred construction and arrangement of the several features, it is to be understood that the device is susceptible of considerable modification therein, and I, therefore, reserve the privilege of adopting all such legitimate changes as may be fairly embodied within the spirit and scope of the invention as claimed.

Having thus fully described my invention, what I desire to claim and secure by Letters Patent is:

1. A grass guard for mowing machines including a rotatable head, a plurality of rearwardly extending, diverging, guard rods fixed in said head, and a spider provided with radially disposed arms provided with openings through which said guard rods extend, to support said rods in predetermined, spaced, diverging relation to each other intermediate their ends, said spider constituting a rigid bracing member and preventing relative inward deflection of said rods.

2. A grass guard for mowing machines including a rotatable head, a plurality of rearwardly extending, diverging, guard rods fixed at one of their ends in said head and disconnected at their other ends, and means rigidly connecting the said rods to each other intermediate of their ends and holding the same against relative movement.

In testimony whereof I hereunto affix my signature in the presence of two witnesses.

VERNESS KING.

Witnesses:
FRED H. BACON,
EARL G. KINGSLEY.

Copies of this patent may be obtained for five cents each, by addressing the "Commissioner of Patents, Washington, D. C."